June 29, 1965

W. R. REMLEY 3,192,315

TWO DIMENSIONAL BANDWIDTH REDUCTION APPARATUS FOR RASTER SCANNING SYSTEMS

Filed Oct. 31, 1962

INVENTOR
WINSLOW R. REMLEY

BY Edward G. Fiorito
AGENT

United States Patent Office 3,192,315
Patented June 29, 1965

3,192,315

TWO DIMENSIONAL BANDWIDTH REDUCTION APPARATUS FOR RASTER SCANNING SYSTEMS

Winslow R. Remley, Bethesda, Md., assignor to International Business Machines Corporation, New York, N.Y., a corporation of New York Filed Oct. 31, 1962, Ser. No. 234,321
4 Claims. (Cl. 178—7.2)

This invention relates to apparatus for reducing the frequency band of electrical signals, and more particularly to such apparatus used in raster scanning systems such as television systems and character recognition systems.

The sharp contrasts of an image caused by the abrupt change in light and dark contours of the image are often found to be redundant and not useful in some raster scanning systems. For example, in character recognition systems the sharp contrasts are unnecessary since the character can be recognized by the general shape of the image. Also in television systems it has been found that the sharp contrasts of the image can be transmitted separately from the background or general quality appearance of the image, resulting in a more efficient transmission of the image.

Raster scanning systems ordinarily scan the image by taking horizontal sweeps across the image a successive number of times. In this manner the image is converted into an electrical signal which represents a plurality of line samples of the image. The sharp contrasts in the image cause high frequency components to appear in the electrical signal. Therefore if the high frequency components are eliminated from the signal the sharp contrasts disappear and the bandwidth of the signal is reduced. Ordinarily this is accomplished by passing the electrical signal through a low-pass filter. However, this results in a smoothing of contrasts only in the horizontal direction since this is the direction in which the image is ordinarily scanned. The normal image, however, included changes in contrast between horizontal scans so that it becomes desirable to smooth the contrasts in the vertical direction in addition to the horizontal direction.

It is an object of the present invention to provide apparatus for reducing the bandwidth of signals generated by raster scanning systems.

It is another object of the present invention to provide apparatus for smoothing the contrasts of a raster scanned image in a direction perpendicular to the direction of the scan.

It is a further object of the present invention to provide apparatus for smoothing the contrasts of a raster image in the direction of the scan and in the direction perpendicular to the direction of the scan.

Briefly, the above objects are accomplished by providing a signal circulating loop including a delay line for storing one scanning line of the image. The stored scanning line is attenuated as it circulates about the loop and is added with the next scannng line. The two stored scanning lines are now circulated about the loop and are attenuated before being added to a third successive scanning line. In this manner a plurality of scanning lines are blended together, the oldest scanning line having the least contribution to the blend. The signal circulating in the loop then represents the scanned image with the contrasts between adjacent horizontal lines blended together to form a smooth change in contrast in the vertical direction.

According to a more detailed aspect of the present invention, a low-pass filter is placed in front of the circulating loop to filter out high frequencies in the signal before entering into the loop. In this manner the signal is filtered so that the image represented thereby undergoes a smoothing of its contrasts first in the horizontal direction and then in the vertical direction, thus achieving a two dimensional bandwidth reduction of the signal.

Frequently, character recognition systems sample the raster scanning signals in order to convert them into digital data for data processing purposes. The number of samples taken, and the time allowed for processing the data is largely dependent upon the bandwidth of the raster scanning signals. Therefore, the present invention has the advantage of reducing the number of samples needed and the time allowed to process the raster scanning signal by eliminating both the horizontal and vertical sharp contrasts and retaining the general shape of the image for recognition by the data processing equipment. Also, where the image is to be transmitted in a television system, the bandwidth requirements of the transmission channel are significantly reduced where the raster scanning signal is first processed by the apparatus of the present invention. Another advantageous feature of the present invention is that various frequency components in the raster scanning signal can be suppressed by altering the attenuation characteristic of the circulating loop, thereby providing a flexibility in selecting the bandwidth to be preserved.

The foregoing and other objects, features, and advantages of the invention will be apparent from the following more particular description of a preferred embodiment of the invention, as illustrated in the accompanying drawings.

Figure 1:
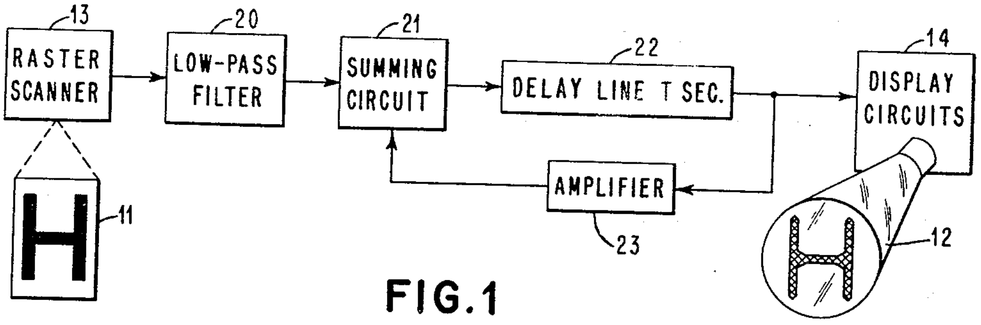
FIG. 1 is a block diagram of a bandwidth reduction apparatus embodying the present invention.

FIG. 1 illustrates a system for scanning the image 11, smoothing the contrasts of the image 11 in both the horizontal and vertical direction, and displaying the image on a face of the cathode ray tube 12.

The raster scanner 13 can be any well known device which scans the image 11, line by line and converts the scanned image into an electrical signal. The display circuits 14 are operated in synchronism with the raster scanner 13 and activate the cathode ray tube to display the image in a manner well known in the television art.

Figure 2:
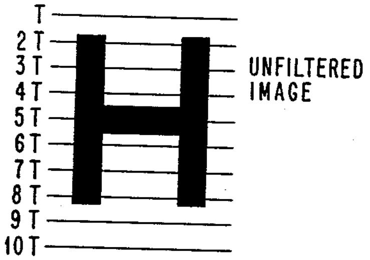
FIG. 2 is a graphical illustration of an image and associated scanning lines.
Figure 3:
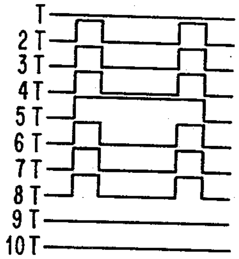
FIG. 3 is a waveform diagram illustrating the electrical signals generated by scanning the image of FIG. 2.

FIG. 2 shows the letter H and ten scanning lines T–10T relative thereto. In this illustration the raster scanner 13 begins sweeping across the image at the top line T and ends the successive scans at the bottom line 10T. FIG. 3 illustrates the electrical signal generated by the raster scanner 13 as a result of each horizontal sweep. For example, the scan at 2T takes on the shape of two pulses resulting from the two top portions of the image H. The scan 5T results in a wide waveform due to the long midsection of the image H. The output of the raster scanner 13 is applied to the input of the low-pass filter 20. The filter 20 suppresses the high frequency components in the signal from the raster scanner 13. Since the high frequency components of the waveform shown in FIG. 3 result from the sharp corners of the pulses, suppression of these high frequencies results in the tapering of these corners as illustrated in FIG. 4.

Figure 4:
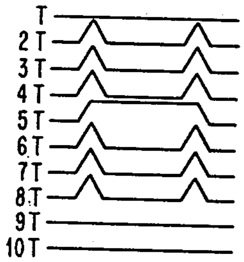
FIG. 4 is a waveform diagram illustrating the signals that result from passing the signals of FIG. 3 through a low-pass filter.
Figure 5:
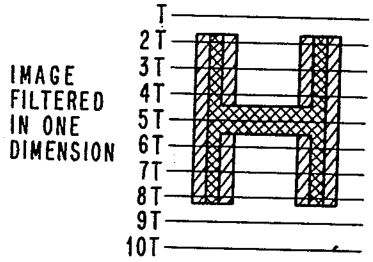
FIG. 5 is a graphical illustration of the image represented by the signals shown in FIG. 4.

The image represented by the waveforms shown in FIG. 4 is illustrated in FIG. 5. Although the voltage level of the waveforms in FIG. 4 increases gradually, the corresponding intensity of the image is approximated by showing two levels of intensity in FIG. 5 instead of a gradual change in intensity. The dark, closely cross-hatched portion of the image in FIG. 5 corresponds to the higher amplitude of the waveforms shown in FIG. 4. For example, at scan 2T the waveform is in the shape of a triangular wave sloping upward resulting in a gradual increase in the intensity of the image followed by a decrease in the intensity of the image as the scan progresses horizontally, from left to right. The scan at 5T slopes upward and remains at a high level of intensity until the end of the scan is approached at which time the intensity decreases. The image in FIG. 5 thus achieves a horizontal smoothing of the contrasts. There is no vertical smoothing of the contrasts as illustrated for example by the horizontal mid-section of the image H which has an abrupt contour line between the light background and dark closely crosshatched section.

The signal from the low-pass filter 20 is applied to the summing circuit 21. The summing circuit applies this signal to the delay line 22. Delay line 22 is selected to have a time delay equal to the length of time taken for one scan of the raster scanner 13. Therefore, one line of the scanned image is stored in the delay line and then fed back through the amplifier 23 to the input of the summing circuit 21. The summing circuit 21 adds the signal stored in the loop 21–23 with the signal representing the next scanning line of the image.

The gain of the amplifier 23 is adjusted so that the gain of the loop 21–23 is less than unity. Therefore, a signal having circulated within the loop 21–23 a plurality of times is attenuated so that it has a small effect upon the new signals introduced into the loop via the low-pass filter 20 and summing circuit 21. In this manner, a plurality of scanning lines are blended together to form a composite signal such as that shown in FIG. 6. For example, when the waveform at 2T in FIG. 4 is introduced into the loop 21–23, this waveform is attenuated and results in the low amplitude signal illustrated at 2T in FIG. 6. However, as additional scanning lines 3T and 4T of FIG. 4 are introduced into the loop 21–23 the signal in the loop begins to build up to the amplitude of the waveform shown at 3T and 4T in FIG. 6. When the wide waveform at 5T, FIG. 4, is introduced into the loop 21–23, the composite signal in the loop appears as shown at 5T in FIG. 6. The previous stored waveforms in the loop 21–23 cause the waveform at 5T, FIG. 6, to have two peaks on either side of the broad intensity level in the middle. Since there is no waveform resulting from the scan at 9T, FIG. 4, introduced into the loop 21–23, the signal within the loop 21–23 begins to attenuate and results in a low intensity waveform as shown at 9T, FIG. 6.

Figure 6:
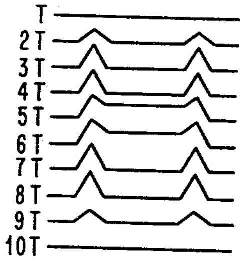
FIG. 6 is a waveform diagram illustrating the signal resulting from the introduction of the signal of FIG. 4 into a circulating loop embodying the present invention.
Figure 7:
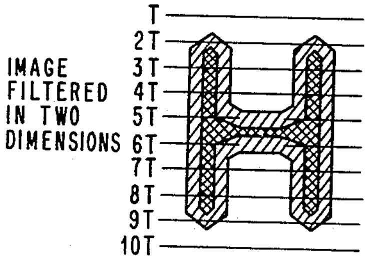
FIG. 7 is a graphical illustration of the image represented by the signals shown in FIG. 6.

FIG. 7 illustrates the image represented by the waveform shown in FIG. 6. The waveform at 2T, FIG. 6, remains at a low amplitude. Therefore, the intensity of the image at 2T, FIG. 7, never reaches the intensity represented by the close crosshatched sections of the image H. However, as the signal in the loop 21–23 increases due to the introduction of new signals via the low-pass filter 20 and summing circuit 21, the intensity of the signal within the loop 21–23 increases to that shown at 3T, FIG. 7, where the intensity of the image reaches the level represented by the closely cross-hatched section. Therefore, the contour line at the top of the image H is spread between the two horizontal scans 2T and 3T resulting in a smooth contrast in the vertical direction. Where a great many more scans than that illustrated in FIG. 6 are taken, the vertical blending is achieved with a smoother effect. The horizontal mid-section of the H is also blended in the vertical direction. The intensity of the corners between the horizontal and vertical sections are shown as tapering intensities, because the intensity at these corners results from signals generated by both the horizontal and vertical sections.

The loop 21–23 acts as a low-pass filter. The pass-band of the loop 21–23 can be altered by changing the gain of the loop. For example, a gain very close to unity would result in a greater smoothing of the image in the vertical direction, caused by the slight attenuation of the many scanning signals stored in the loop. This would result in a greater attenuation of the higher frequency components in the scanning signals. On the other hand, a gain in the loop 21–23 much less than unity would have a limited effect upon the scanning signal due to the high attenuation of the scanning signals stored in the loop. Therefore, more of the high frequencies in the scanning signals would be retained.

One extension of the present invention would be to employ two loops such as the loop 21–23, each having different pass-bands. By combining the outputs from the loops, a band-pass filter may be synthesized.

For some applications it may be desirable to blend the image in the vertical direction only. In this case the low-pass filter 20 could be eliminated.

In the preferred embodiment illustrated in FIG. 1, the time delay of the line 22 was selected to be equal to the scanning rate of the scanner 13. However, a time delay equal to any integral multiple, in addition to the first integral multiple, of the scanning rate can be selected in order to achieve a blending effect according to the present invention.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A system for reducing the bandwidth of a signal generated by a raster scanning device making line by line scans, comprising:

filter means for accepting the signal and suppressing certain frequency components therein to smooth the signal transitions in each line scan; and a signal circulating loop circuit having a loop gain of less than unity for blending signals from the line scans, said loop including a series connected delay line element having a time delay equal to an integral multiple of the time for a single line scan, and a summing means for combining the output signal of said filter means with signals circulating in said loop to smooth signal transitions between corresponding points on scan lines following in integral succession from each other, whereby said loop circuit acts in series with said filter means to smooth the signal transitions both along the scan lines and between the scan lines.

2. A low-pass filtering system for filtering an image signal generated by a raster scanning device making line by line scans, the filtering system acting to smooth image signal transitions in the direction of scan and in the direction perpendicular to the direction of the scan, comprising:

low-pass filter means for accepting said image signal and suppressing high frequency components therein to smooth image signal transitions in the direction of the scan; and a signal circulating loop circuit having a loop gain of less than unity for blending signals from the line scans, said loop including a series connected delay line element having a time delay equal to an integral multiple of the time for a single line scan, and a summing means connected in series relationship within said loop circuit for combining the output signal of said filter means with signals circulating in said loop to smooth the image signal transitions in a direction perpendicular to the direction of the scan, whereby said loop circuit acts in series with said filter means to smooth the image signal transitions in both the direction of the scan and the direction perpendicular to the direction of the scan.

3. In a system for smoothing the contrasts of a raster scanned image in the direction of the scan and in a direction perpendicular to the direction of the scan, the combination of:

raster scanning means for scanning said image line by line and converting said image into electrical signals;

low-pass filter means for accepting said electrical signals and suppressing high frequency components therein so that said electrical signals are filtered to smooth the sharp contrasts of the raster scanned image in the direction of the scan; and a signal circulating loop circuit having a loop gain of less than unity for blending electrical signals from the line scans, said loop including a series connected delay line element having a time delay equal to an integral multiple of the time for a single line scan, and a summing means connected in series relationship within said loop circuit for combining the output of said filter means within signals circulating in said loop so that said loop circuit filters the electrical signals to smooth the sharp contrasts of the raster scanned image in the direction perpendicular to the direction of the scan and acts in series with said filter means to smooth the sharp contrasts of the raster scanned image both in the direction of the scan and in the direction perpendicular to the direction of the scan.

4. A system for smoothing the sharp contrasts of a raster scanned image in the direction of the scan and in a direction perpendicular to the direction of the scan, comprising:

raster scanning means for scanning said image line by line and converting said image into electrical signals;

low-pass filter means for accepting said electrical signals and suppressing high frequency components therein so that said electrical signals are filtered to smooth the sharp contrasts of the raster scanned image in the direction of the scan;

a signal circulating loop circuit having a loop gain of less than unity for blending electrical signals from the line scans, said loop including a series connected delay line element having a time delay equal to an integral multiple of the time for a single line scan, and a summing means connected in series relationship within said loop circuit for combining the output of said filter means with signals circulating in said loop so that said loop circuit filters the electrical signals to smooth the sharp contrasts of the raster scanned image in the direction perpendicular to the direction of the scan and acts in series with said filter means to smooth the sharp contrasts of the raster scanned image both in the direction of the scan and in the direction perpendicular to the direction of the scan; and display means connected to said loop circuit operated in synchronism with said raster scanning means for displaying the image represented by the signals circulating in said loop, whereby said displayed image is a replica of said scanned image having smooth contrasts in two dimensions.

References Cited by the Examiner

UNITED STATES PATENTS

| | | | |
|---|---|---|---|
| 2,996,574 | 8/61 | Tobey | 178—6 |
| 3,017,456 | 1/62 | Schreiber | 179—15.55 |

DAVID G. REDINBAUGH, *Primary Examiner.*